United States Patent
Nguyen et al.

(10) Patent No.: US 6,454,462 B2
(45) Date of Patent: Sep. 24, 2002

(54) HDTV CAMERA CABLE CONNECTOR

(75) Inventors: Hiep V. Nguyen, Charlotte, NC (US); Steve Bateman, Waxhaw, NC (US); Jim Kennedy, Rock Hill, SC (US)

(73) Assignee: Kings Electronics Co., Inc., Rock Hill, SC (US)

( * ) Notice: Subject to any disclaimer, the term of this patent is extended or adjusted under 35 U.S.C. 154(b) by 0 days.

(21) Appl. No.: 09/813,034

(22) Filed: Mar. 20, 2001

Related U.S. Application Data
(60) Provisional application No. 60/198,001, filed on Apr. 18, 2000.

(51) Int. Cl.[7] .................................................. G02B 6/36
(52) U.S. Cl. .......................................... 385/53; 439/577
(58) Field of Search ............................ 385/53, 75, 101; 439/584, 577

(56) References Cited

U.S. PATENT DOCUMENTS

| | | | |
|---|---|---|---|
| 3,283,287 A | 11/1966 | Stark et al. | |
| 3,671,922 A | 6/1972 | Zerlin et al. | |
| 4,037,909 A | 7/1977 | Trompeter et al. | |
| 4,167,304 A | 9/1979 | Gelbke | |
| 4,182,017 A | 1/1980 | Ford et al. | |
| 4,195,045 A | 3/1980 | Mead | |
| 4,326,769 A | 4/1982 | Dorsey et al. | |
| 4,362,356 A | 12/1982 | Williams et al. | |
| 4,449,784 A * | 5/1984 | Basov et al. | 385/136 |
| 4,568,145 A * | 2/1986 | Colin et al. | 385/69 |
| 4,609,242 A | 9/1986 | Kemppainen | |
| 4,628,159 A | 12/1986 | Deitch et al. | |
| 4,648,688 A | 3/1987 | Ashman et al. | |
| 4,674,833 A | 6/1987 | Des Forges et al. | |
| 4,690,481 A | 9/1987 | Randolph | |
| 4,711,517 A | 12/1987 | Fentress et al. | |
| 4,728,171 A | 3/1988 | Schofield et al. | |
| 4,743,084 A | 5/1988 | Manning | |
| 4,786,134 A | 11/1988 | Fort et al. | |
| 4,895,426 A | 1/1990 | Pinson | |
| 4,895,530 A | 1/1990 | Gugelmeyer et al. | |
| 4,902,092 A | 2/1990 | Grandy | |
| 5,146,528 A | 9/1992 | Gleim et al. | |
| 5,209,678 A | 5/1993 | Allen et al. | |
| 5,249,246 A | 9/1993 | Szanto | |
| 5,263,105 A | 11/1993 | Johnson et al. | |
| 5,325,452 A | 6/1994 | Stein et al. | |
| 5,371,819 A | 12/1994 | Szegda | |
| 5,408,558 A | 4/1995 | Fan | |
| 5,461,688 A * | 10/1995 | Lee | 385/75 |
| 5,491,766 A | 2/1996 | Huynh et al. | |
| 5,574,815 A | 11/1996 | Kneeland | |
| 5,592,579 A | 1/1997 | Cowen et al. | |
| 5,621,836 A | 4/1997 | Schofield et al. | |
| 5,631,986 A | 5/1997 | Frey et al. | |
| 5,666,453 A | 9/1997 | Dannenmann | |
| 5,745,627 A | 4/1998 | Arroyo et al. | |
| 5,764,043 A | 6/1998 | Czosnowski et al. | |
| 5,812,718 A | 9/1998 | Carpenter et al. | |
| 5,825,963 A | 10/1998 | Burgett | |
| 5,850,496 A | 12/1998 | Bellahsène et al. | |
| 5,917,977 A | 6/1999 | Barrett | |
| 6,010,250 A | 1/2000 | Sung | |

* cited by examiner

Primary Examiner—Tulsidas Patel
Assistant Examiner—Hae Moon Hyeon
(74) Attorney, Agent, or Firm—Alston & Bird LLP (57) ABSTRACT

A cable connector is disclosed for hybrid cables having optical fibers, power lines, and audio lines. In one embodiment, the cable connector includes male and female portions having corresponding male and female contact pins for the power and audio lines, and forwardly-biased ferrules housing the optical fibers. All the lines and optical fibers are secured in an insulator device by an insulator lock that lockably engages a receptacle of the insulator device. Each hybrid cable is further secured and sealed with a grip member and a crimp ring. The cable connector of the present invention allows for field serviceability without the use of potting compounds.

25 Claims, 7 Drawing Sheets

HDTV CAMERA CABLE CONNECTOR

FIELD OF THE INVENTION

This application claims the benefit of U.S. Provisional Application No. 60/198,001, filed Apr. 18, 2000. The present invention relates to cable connectors, and more particularly to cable connectors capable of transferring signals over both optical fibers and conventional electrical wires.

BACKGROUND OF THE INVENTION

In the broadcast and video industries, coaxial, twinaxial, and triaxial cables have been relied upon heavily for transmission purposes, particular at bandwidths up to around 750 MHz. These cables could be terminated in a conventional manner with a wide range of connectors that were available from many manufacturers. One particular connector is called a "Tri-Loc®" connector, available from Kings Electronics (http://www.kingselectronics.com). However, with the move towards high definition television (HDTV) and other applications that require higher signal transmission rates compared to the conventional transmission rates, the broadcast and video industries are, in many applications, replacing coaxial, twinaxial, and triaxial cables with a hybrid cable that comprises a combination of electrical conductors and single-mode optical fibers. These hybrid cables permit digital signal transmissions at increased transmission rates over longer distances when compared to the conventional cables. Hybrid cables are available from many manufacturers, such as Commscope (http://www.commscope.com). To keep up with the changes in the cable construction, these industries also require a connector to suitably connect these hybrid cables.

For conventional power and signal wires, typically a plug and socket arrangement is provided for connecting the wires, which are usually copper wires. Many applications require a minimal contacting relationship in order to sufficiently transfer the signal. Connection beyond the minimal contacting relationship is not necessary, because the connection is made through the circumference of the respective plug and socket. Optical fibers, however, require special connections in order to properly transfer signals.

Fiber optic cables and connectors have been used for some time in the telecommunications and broadcast industries. In fact, fiber optic cables have become the standard transmission line through which information is sent. Many different types of fiber optic cables and connectors are present in the market place. A common method of making a connection between two optical fibers is to align the fibers such that the faces of the fibers oppose one another in an abutting relationship. This relationship enables the light pulses or signal transmissions travelling along the optical fibers to be transferred across the splice. If the face of one fiber is misaligned relative to the adjacent face of the other fiber, however, light is lost and quality of transmission is affected. It is therefore extremely important for fiber optic cables to have a low-tolerance fitting between splices.

A typical hybrid cable connector and technique uses several non-reusable components and urethane potting materials to isolate, secure, and protect the optical fibers and electrical conductors within the respective male and female bodies of the connector. The problem with such a connector and technique is that the potting compound is required to make the connection structurally sound, electrically insulated, and waterproof. As a result, the potting compound has to be poured or coated over the respective lines and cured before the connection can be tested, which requires a significant amount of time. If the connection needs to be redone, however, the components that are coated with the potting compound must be thrown away and the process must start from the beginning. This can be a time consuming and wasteful exercise, particular if the connection between the optical fibers is difficult to achieve and must be repeated multiple times.

Another problem with conventional hybrid connectors and techniques is that these connectors are not serviceable in the field. More specifically, conventional hybrid connectors do not provide a method of repairing damaged optical fibers except by a machine polishing technique that typically must be performed by the manufacturer. This is particularly troublesome to the equipment operator working in an unpredictable environment. For example, if an HDTV camera operator is transmitting from an outside sporting event, and the cable connecting the camera to the transmission source is severed or damaged, conventional connectors and techniques require the operator to disconnect the hybrid cable and install a new cable. Thus, an operator is required to carry spare or backup cables in case of the above-mentioned occurrences, which adds cost and bulk to the operator's assignment. In addition, the camera operator is required to send the severed or damaged cable (with attached connectors) to the manufacturer so that the manufacturer can repair the cable. Disadvantageously, this further adds expense and time to the operator's activities.

Accordingly, there is a need to provide a hybrid cable connector that can be adjusted and repaired in the field without having to be completely replaced or without wasting many components. There is also a need to provide a hybrid cable connector that is easy to connect to a hybrid cable and that provides structural integrity, electrical insulation, and protection against water without the use of potting compounds.

SUMMARY OF THE INVENTION

These and other needs are provided, according to the present invention, by a hybrid cable connector capable of connecting two hybrid cables having optical fibers and electrical wires. Advantageously, the hybrid cable connector of the present invention is field serviceable, thus allowing an operator to repair a damaged or broken hybrid cable in the field of operation instead of requiring the operator to disconnect the cable and send it back to the manufacturer for repair. Specifically, the hybrid cable connector and associated technique allows for the optical fibers to be prepared and repaired by the operator using hand tools while in the field. In addition, the hybrid cable connector of the present invention provides a unique insulator lock that provides structural integrity, electrical insulation, and waterproof protection to the optical fibers and electrical wires. Thus, the hybrid cable connector of the present invention does not require the use of potting compounds or other materials which add cost, time, and complexity to the connector and associated repair methods.

In particular, the hybrid cable connector of the present invention comprises male and female portions that cooperate to connect two hybrid cables. Each portion includes an outer housing defining a passage extending axially therethrough for receiving an end of a cable. Each portion also includes an insulator device having proximal and distal ends secured within the passage of the outer housing. In one embodiment, the housing comprises a strong metallic material, although non-metallic materials may also be used. The insulator device defines six channels therethrough for receiving two optical fibers or lines, two power lines, and two audio lines. Each line is attached to a respective connection contact, such as a contact pin or ferrule. The insulator lock slidably engages the insulator device, such as by a removable snapping action, for restricting the movement of the contacts within the insulator device. A spacer is provided for further structural integrity within the housing of the male and female portions of the connector. The housings of the male and female portions include a keying feature that resembles a tongue and groove configuration. In this regard, the male and female portions are prevented from rotating relative to one another.

To connect the hybrid cable to the connector of the present invention, the power and audio lines are terminated to the respective contacts by crimping or soldering. In one embodiment, the contacts for the power and audio lines comprise a conductive material, such as beryllium copper. In one embodiment, the optical fibers or lines are terminated pursuant to assembly instructions provided by Alcoa Fujikura Telecommunications. In particular, an Alcoa Fujikura field connection kit including a publication entitled "Assembly Instructions For AFL Field Master™ ST Connectors Using Loctite 680 Adhesive," form No. AFM 307-130, which is expressly incorporated herein by reference, is particularly useful in preparing the optical fibers for assembly within the male and female portions of the connector. Advantageously, the Alcoa field connection kit includes ceramic ferrules that receive the optical fibers. Other ferrules and contact members are also included in the kit. Once all the optical fibers and electrical conductors have been properly prepared, they are axially inserted into the respective insulator device in a predetermined pattern that corresponds to the pattern in the opposite insulator device. A bias member or spring is provided adjacent each optical fiber for biasing the optical fiber towards the open end of the insulator device. Specifically, the spring biases the contact members and ferrules against respective stops defined by the insulator device. Thus, the spring ensures positive contact between the corresponding optical fibers from the respective male and female portions. The insulator lock slidably engages the distal end of the respective insulator device and is secured thereto by a locking interference fit, such as a snap fit, between the insulator device and the insulator lock. The spacer is slidably engaged over the hybrid cable until it is adjacent the insulator lock. The hybrid cable, which in one embodiment includes an outer conductive braid, is secured to the respective housing by a crimp ring. The crimp ring provides sufficient strength between the cable and the connector to withstand a minimum of 120 pounds of pull force. A rubber-type washer is also provided to seal the inside of the housing from the environment.

The connector according to the present invention is capable of the following minimum performance requirements:

| Optical Wave Length: | 1000 nm–1500 nm |
| Insertion Loss: | 0.5 dB maximum |
| Return Loss: | −45 dB maximum |
| Operating Temperature Range: | −20° C. to +70° C. |
| Operating Humidity: | <95% RH (at +40° C.) |

In addition, the connector of the present invention will meet the testing requirements of Underwriters Laboratories (UL), the Canadian Standards Association (CSA), or other similar authorities appropriate to the intended use of the connector.

Thus, the hybrid cable connector of the present invention provides important advancements in the state of the art. Specifically, the connector of the present invention can be adjusted in the field without wasting components as can occur when using potting compounds and/or other conventional methods. In addition, the locking interference fit between the insulator device and the insulator lock of the present invention allows for a secure connection between the opposing optical fibers and electrical conductors of the male and female portions of the connector.

BRIEF DESCRIPTION OF THE DRAWINGS

Having thus described the invention in general terms, reference will not be made to the accompanying drawings, which are not necessarily drawn to scale, wherein:

DETAILED DESCRIPTION OF THE DRAWINGS

Figure 1:
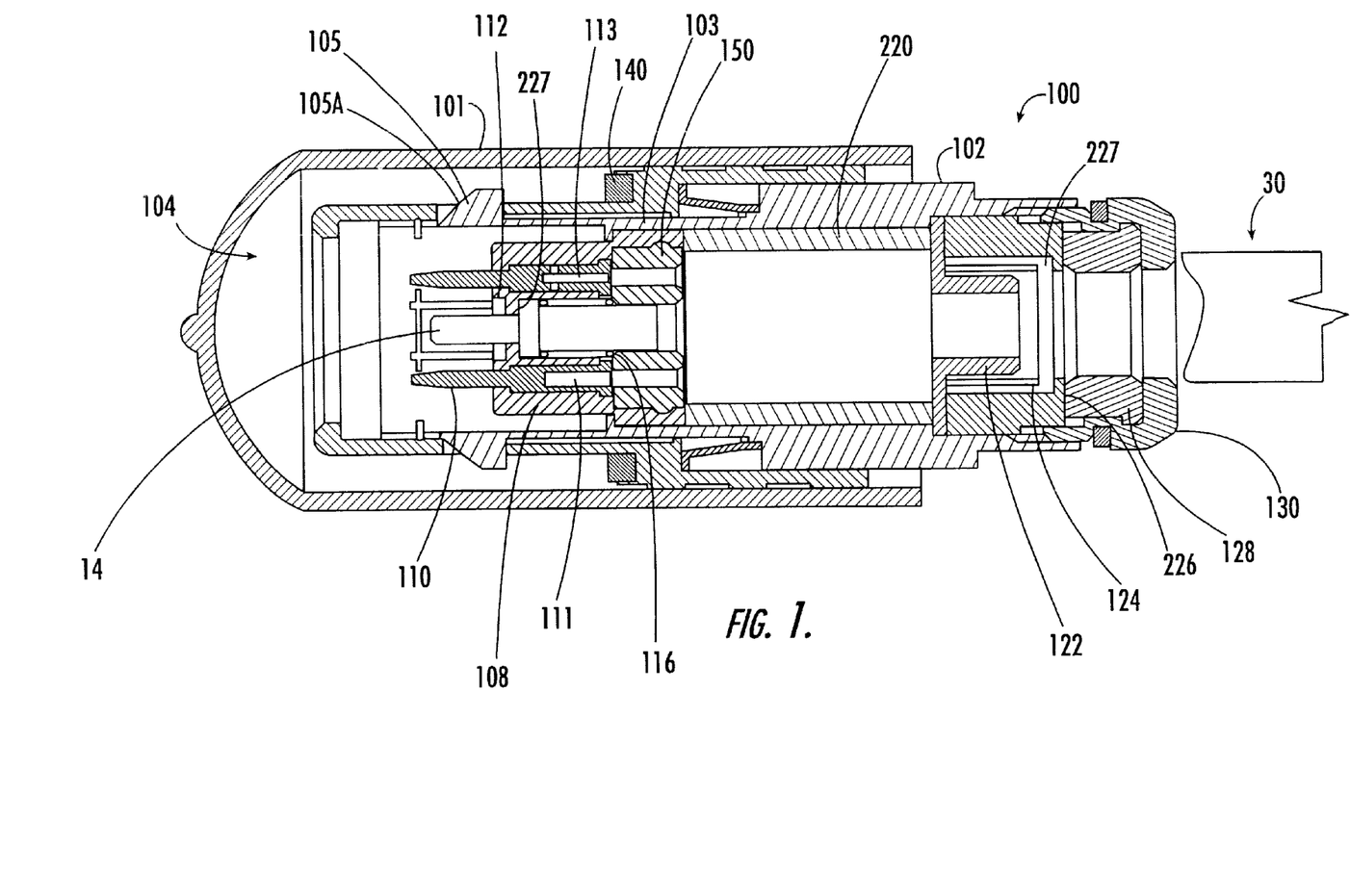
FIG. 1 is an enlarged sectional side view of a male portion of a connector according to one embodiment of the present invention.
Figure 2:
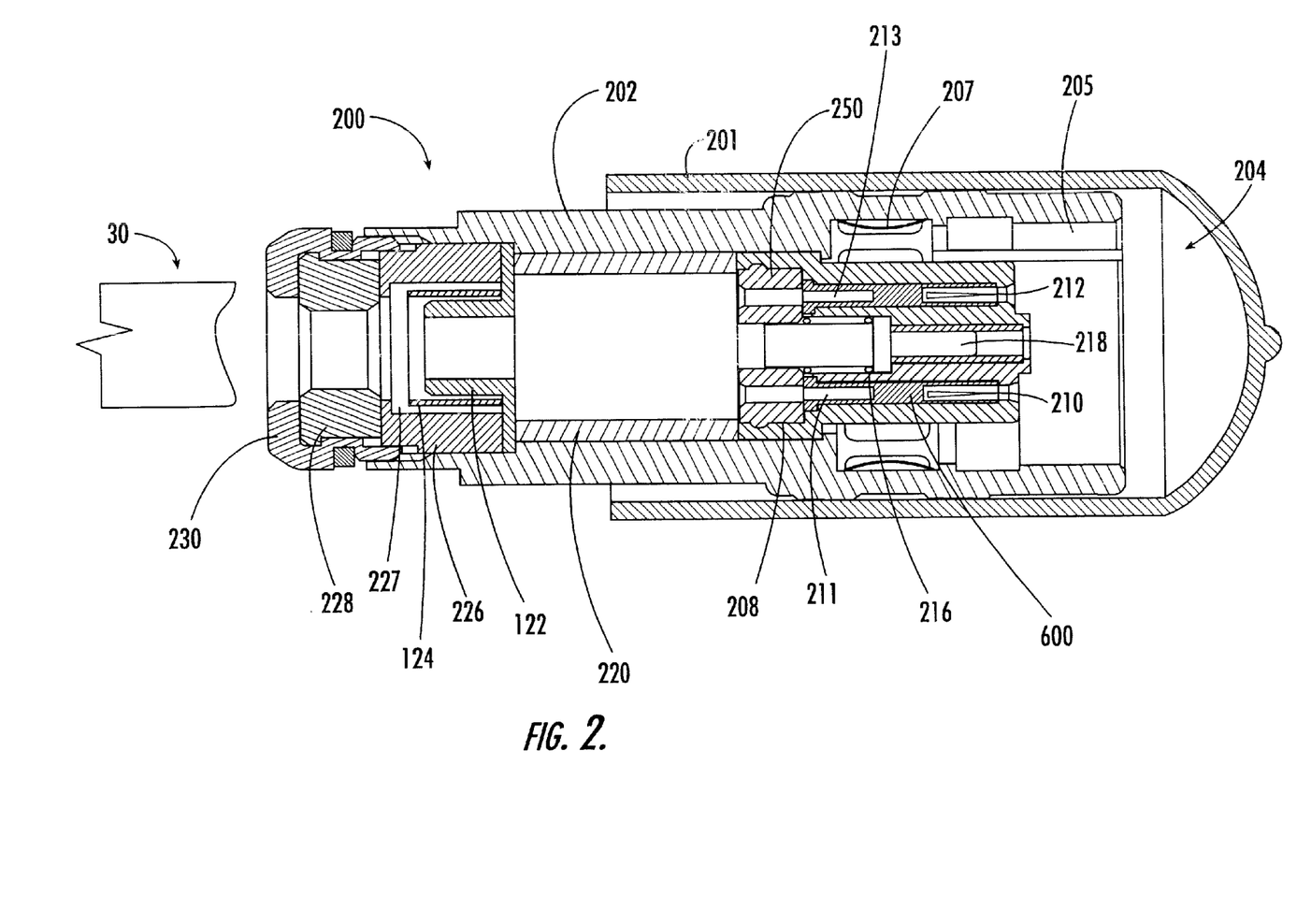
FIG. 2 is an enlarged sectional side view of a female portion of a connector according to one embodiment of the present invention.
Figure 3:
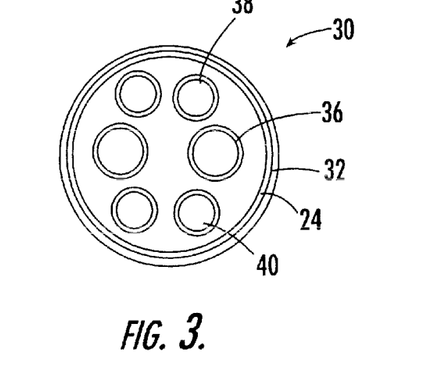
FIG. 3 is an enlarged sectional end view of a hybrid cable for use with the connector of the present invention.

Turning to the drawings, FIGS. 1 and 2 show the male portion 100 and female portion 200 of the connector according to one embodiment of the present invention. The connector is preferably for use with a hybrid cable, as shown in FIG. 3. The hybrid cable 30 comprises two optical fibers 36, two power lines 38, and two audio lines 40. In one embodiment, the optical fibers and lines are surround by a conductive braid 34, which is preferably formed of copper, although other metals may also be used. An insulative sheath 32 surrounds the braid 34. Referring to FIG. 1, the male portion 100 is shown with a removable cap 101 that protects the open end 104 connector from the enviroment when not engaged with the female portion 200. The male portion includes a housing 102 and a spring body 103. The spring body 103 includes projections 105 that extend outwardly and define an angled surface 105A. The angled surfaces 105A of the projections 105 allow the male member 100 and female member 200 to be slidably engaged until locked together. A spacer 140 surrounds the spring body 103. At least one projection 105 extends outwardly from the spring body 103. The spring body 103 defines a central opening that houses an insulator device 108. The insulator device 108 comprises an insulative material, such as polycarbonate or ABS plastic, although other materials can also be used. The insulator device 108 defines six openings therethrough, as discussed more fully below. A contact pin 112 extends through the insulator device 108 and defines an opening 113 at the distal end of the pain for receiving one of the power 38. Similarly, a contact pin 110 extends through the insulator device 108 and defines an opening 111 for receiving one of the audio lines 40.

A ferrule 114 also extends through the insulator device. In one embodiment, the ferrule 114 comprises an insulative material and defines a central opening therethrough for receiving one of the optical fibers 36. A bias member 116, which may be in the form of a coil spring, is positioned adjacent the ferrule 114 for biasing the ferrule towards the open end 104 of the male portion 100. As discussed below, the ferrule 114 abuts an opposing ferrule 218 (see FIG. 2) so that the corresponding optical fibers housed within each ferrule form a continuous path for light to pass. In addition, an insulator lock 150 is positioned proximate the ferrule 114 for securing the ferrule and contact pins 110, 112. Advantageously, the insulator lock 150 secures the ferrule 114 and contact pins 110, 112 in a quick, easy, snap-like fashion, which enables the components of the connector to be assembled in the field without potting compounds. Moreover, if the alignment of the ferrule 114 or the contact pins 110, 112 is poor during assembly or becomes poor sometime after assembly, the insulator lock 150 can be easily removed and the positioning of the misaligned ferrule or pins can be realigned. Thus, the connector can be easily repaired without removing solidified potting compound and reapplying new potting compound, as would be required by conventional connectors.

Figure 11:
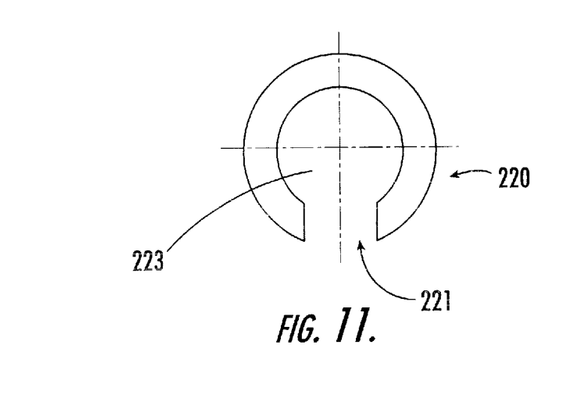
FIG. 11 is an end view of a tubular spacer according to one embodiment of the present invention.

A tubular spacer 220 is positioned proximate the insulator device 108. As shown in more detail in FIG. 11, the spacer is generally "C" shaped and defines a side opening 221 and a central opening 223. In one embodiment, the spacer 220 is formed of a resilient material, such as a thermoplastic. To further secure and seal the cable 30, a grip member 122 is positioned adjacent the spacer 220. The grip spacer 124 is positioned around a portion of the grip member 122. A fitting member 226 surrounds the grip spacer 124. A washer 128, which in one embodiment is formed of a resilient rubber-like material, is positioned adjacent the fitting member 226. An end cap 130 surrounds the washer 128.

The female portion 200 is shown with a removable cap 201 that protects the open end 204 connector from the environment when not engaged with the male portion 100. The female portion includes a housing 202 and an insulator device 208. The outer body 202 defines at least one groove 205. A bias member 207 extends inwardly from the outer body 292. The insulator device 208 comprises an insulative material, such as polycarbonate or ABS plastic, although other materials could also be used. The insulator device 208 defines six openings therethrough, as discussed more fully below. A contact pin 212 extends through the insulator device 208 and defines an opening 213 at the distal end of the pin for receiving one of the contact pins 112 connected to one of the power lines 38. Similarly, a contact pin 210 extends through the insulator device 208 and defines an opening 211 for receiving one of the contact pins 110 connected to one of the audio lines 40.

The ferrule 218 also extends through the insulator device 208. In one embodiment, the ferrule 218 comprises an insulative material and defines a central opening or bore therethrough for receiving one of the optical fibers 36. Preferably, the ferrule has a diameter of at least 1.5 mm, such as between 2.0–2.5 mm, although ferrules having smaller dimensions may also be used. The central opening or bore of the ferrule, however, remains the same regardless of the diameter of the ferrule. As described above, the opposing ferrules 114 and 218 position opposing optical fibers 36 in an abutting relationship for light transmission. A bias member 216, which may also be in the form of a coil spring, is positioned adjacent the ferrule 218 for biasing the ferrule towards the open end 204 of the female portion 200. Another insulator lock 250, which is otherwise identical to the insulation lock 150, secures the ferrule 218 and contact pins 210, 212.

A tubular spacer 220 is positioned proximate the insulator device 208 for further securing the hybrid cable. A grip member 122 is positioned adjacent the spacer 220. A grip spacer 124 is positioned around a portion of the grip member 122. A fitting member 226 surrounds the grip spacer 124. A crimp ring 227 surrounds the grip spacer 124. A washer 228, which in one embodiment is formed of a rubber-like material, is positioned adjacent the fitting member 226. An end cap 230 surrounds the washer 228.

Figure 4:
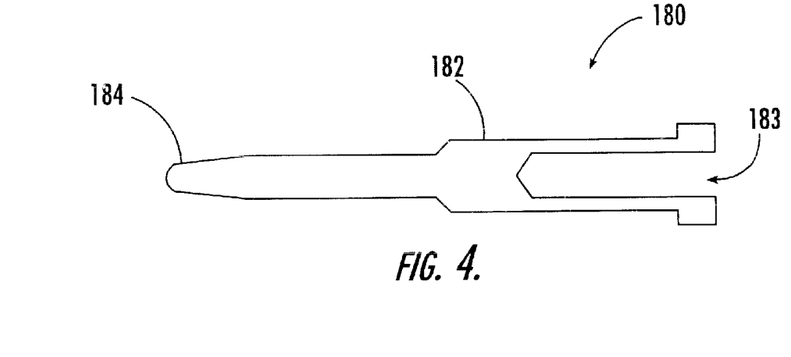
FIG. 4 is an enlarged sectional side view of a conductor pin according to one embodiment of the present invention.

FIG. 4 shows a detailed view of a conductor pin 180, such as pins 110 and 112, for connecting electrical wires. The pin 180 has an elongate body 182 and a tip 184 at one end. The other end defines an opening 183 for receiving and securing an audio or power line, such as by crimping or soldering. Other techniques may also be used.

Figure 5A:
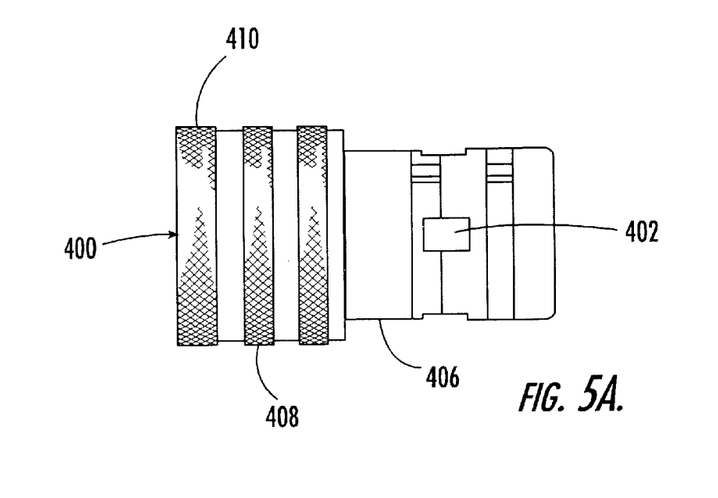
FIG. 5A is an enlarged side view of a male tubular connector body according to one embodiment of the present invention.
Figure 5B:
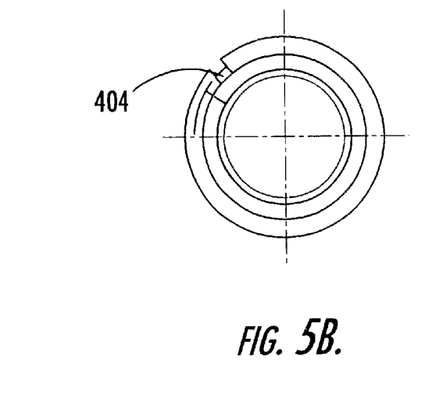
FIG. 5B is a sectional end view of the connector body of FIG. 5A.

FIGS. 5A and 5B show a tubular connector body 400 that can be attached to the male portion 100. The connector body 400 includes a center portion 406 and a gripping portion 410. In one embodiment, the gripping portion 410 has a knurled surface 408. The center portion 406 includes an extending tab portion 404 that acts as a guide, as discussed more fully below. The center portion 406 defines at least one opening 402 for receiving a corresponding projection 105 of the male portion 100. The connector body 400 is made from a wear-resistant metal, such as brass.

Figure 6:
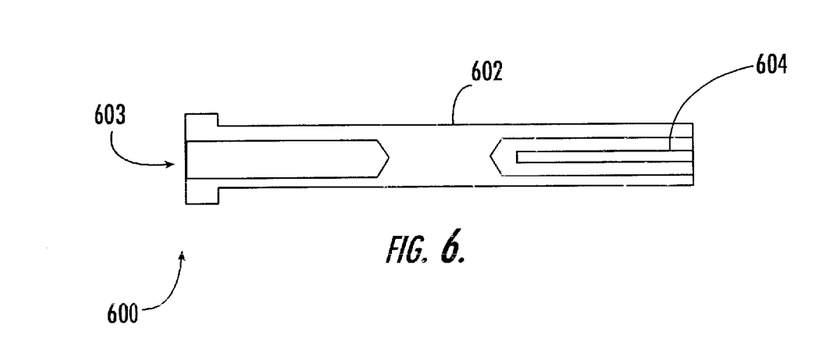
FIG. 6 is an enlarged sectional side view of a female contact pin according to one embodiment of the present invention.

FIG. 6 shows a detailed view of a female contact pin 600, such as contact pins 210 and 212 for connecting electrical wires. The contact pin 600 includes a main body portion 602 and defines an opening 603 at one end for receiving a wire, such as an audio or power line. The other end defines a slotted opening 604 for engaging a corresponding male pin, such as the contact pin 180. The contact pin 600 is formed of a conductive material, such as beryllium copper.

Figure 7A:
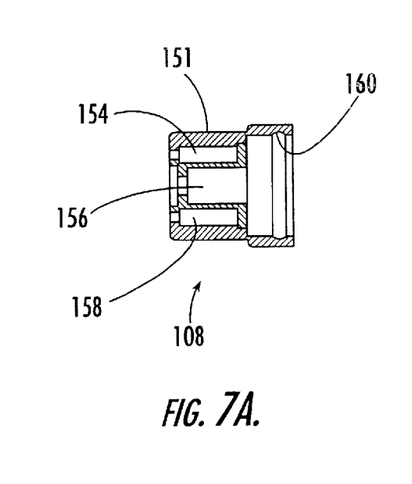
FIG. 7A is a sectional side view of a male insulator device according to one embodiment of the present invention.
Figure 7B:
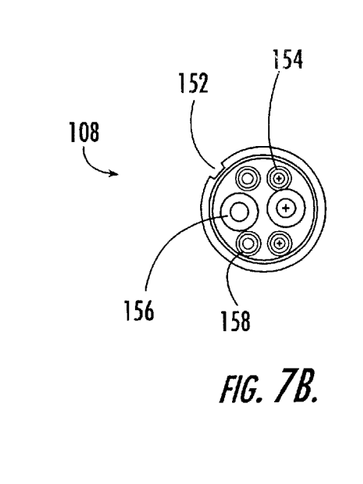
FIG. 7B is a sectional end view of the insulator device of FIG. 7A.

FIGS. 7A and 7B show detailed views of the insulator device 108 shown FIG. 1. The insulator device 108 comprises a main body 151 and defines a groove 152 in the outer surface thereof. At least two side-by-side apertures are defines axially through the insulator device 108. In a preferred embodiment, six channels are defined through the main body 151. In particular, two channels 154 receive the power lines 38 of the hybrid cable 30 via the contact pins 112, two channels 158 receive the audio lines 40 via the contact pins 110, and two channels 156 receive the optical fibers 36 the ferrules 114. A pair of shoulders or stops 187, 227 are defined by the insulator device 108 for retaining the contact pins 110, 112 and ferrules 114. Advantageously, the insulator device 108 includes a receptacle or recessed annular channel 160 for mating with the insulator lock 150 to secure the contact pins 110, 112 and ferrules 114 as described above.

Figure 8A:
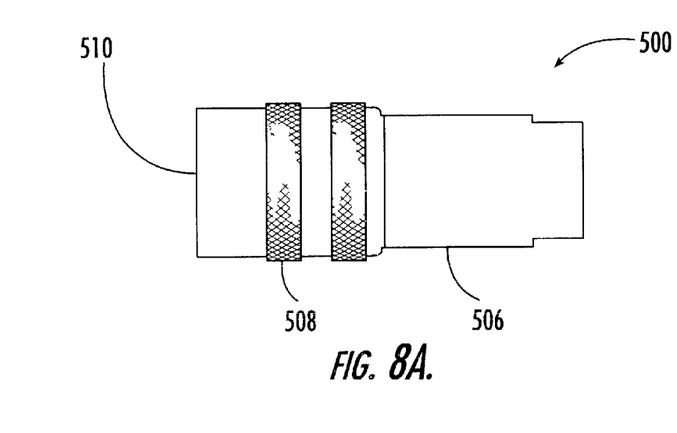
FIG. 8A is a sectional side view of a female tubular connector body according to one embodiment of the present invention.
Figure 8B:
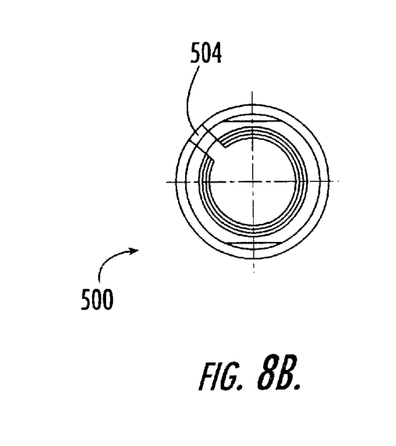
FIG. 8B is a sectional end view of the connector body of FIG. 8A.

FIGS. 8A and 8B show a connector body 500 for use with the female portion 200 shown in FIG. 2. The connector body 500 is made from a wear-resistant metal, such as brass, and includes a center portion 506 and a gripping portion 510. In one embodiment, the gripping portion 510 has a knurled surface 508. The center portion 506 defines a slot 504 for receiving the extending tab portion 404 of the male connector body 400. In this regard, the extending tab portion 404 and slot 504 act as guides so that the corresponding electrical conductors (power and audio) and optical fibers are properly aligned.

Figure 9A:
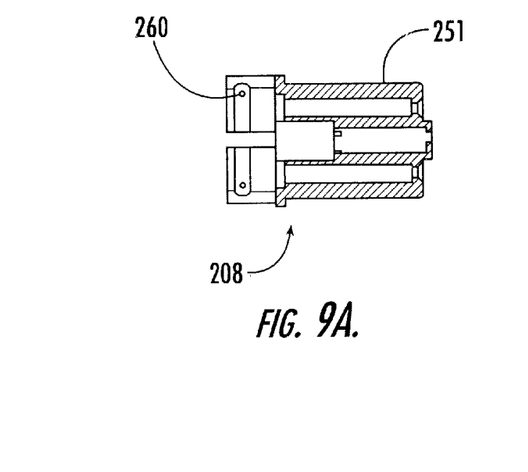
FIG. 9A is a sectional side view of a female insulator device according to one embodiment of the present invention.
Figure 9B:
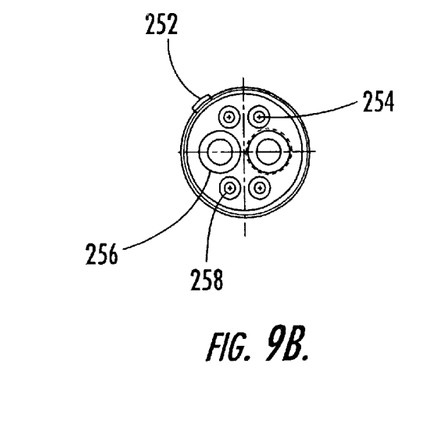
FIG. 9B is a sectional end view of the insulator device of FIG. 9A.

FIGS. 9A and 9B show detailed views of the female insulator device 208. The insulator device 208 comprises a main body 251 and defines an extending tab portion 252 that mates with the groove 152 of the insulator device 108. In this regard, the mating extending tab portion 252 and groove 152 ensure that the corresponding male and female contacts are properly aligned. Six channels that correspond to the channels defined in the insulator device 108 are defined in the insulator device 208. In particular, two channels 254 receive the power lines 38 of the hybrid cable 30 via the contact pins 212, two channels 258 receive the audio lines 40 via the contact pins 210, and two channels 256 receive the optical fibers 36 via the ferrules 218. Advantageously, the insulator device 208 includes a receptacle 260, which in one embodiment is a recessed annular channel, for mating with the insulator lock 250 to secure the contact pins 210, 212 and ferrules 218 into place.

Figure 10A:
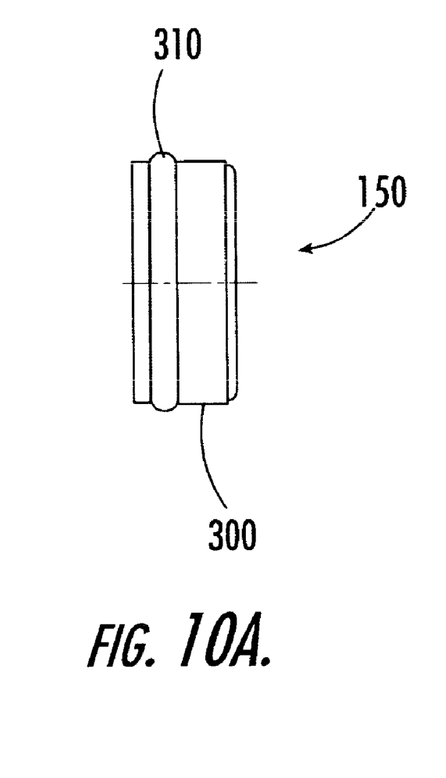
FIG. 10A is a side view of an insulator lock according to one embodiment of the present invention.
Figure 10B:
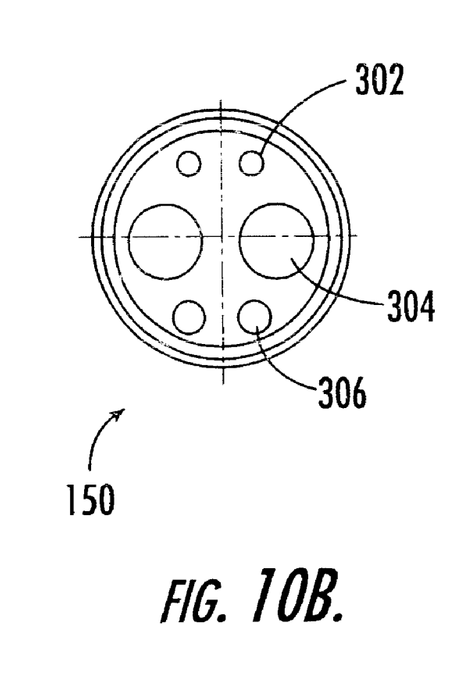
FIG. 10B is an end view of the insulator lock of FIG. 10A.

FIGS. 10A and 10B show detailed views of one of the insulator locks 150 and 250. The lock 150 includes a body 300 defining six channels or passages therethrough. In particular, channels 302 correspond to the channels 154 and 254, channels 306 correspond to the channels 158 and 258, and channels 304 correspond to the channels 156 and 256. Advantageously, the lock 150 includes a raised portion 130, such as an annular lip, for engaging the recessed annular channels 160, 260 and forming an interference fit therebetween. In the engaged position, the audio lines 40, power lines 38, and optical fibers 36 are restricted from movement. The lock 150 can be removed, however, by disengaging the snap-like interference fit between the lock and the annular channels 160, 260 so that the electrical conductors and optical fibers can be repaired, adjusted, or the like.

Figure 12:
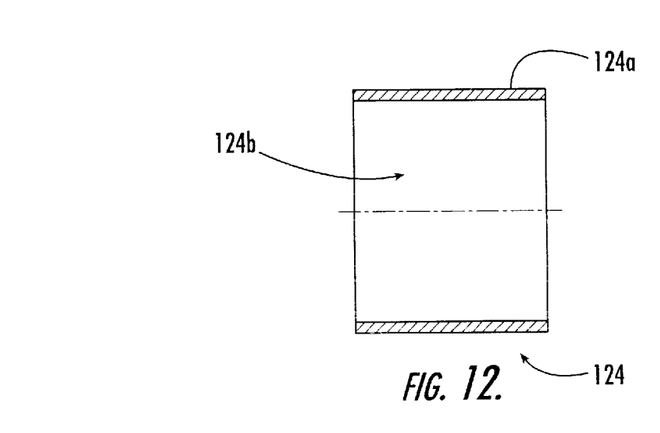
FIG. 12 is a sectional side view of a grip spacer according to one embodiment of the present invention.

FIG. 12 shows a detailed view of the grip spacer 124. In one embodiment, the grip spacer 124 is formed of a conductive material, such as bronze, although other materials may also be used. The grip spacer 124 includes a tubular body 124a and defines a central opening 124b therethrough. The grip spacer 124 slidably engages the grip member 122 for securing the braid 34 of the hybrid cable 30. In particular, the grip spacer 124 is disposed about the knurled surface 122c of the grip member 122 such that the braid 34 is interposed therebetween.

Figure 13:
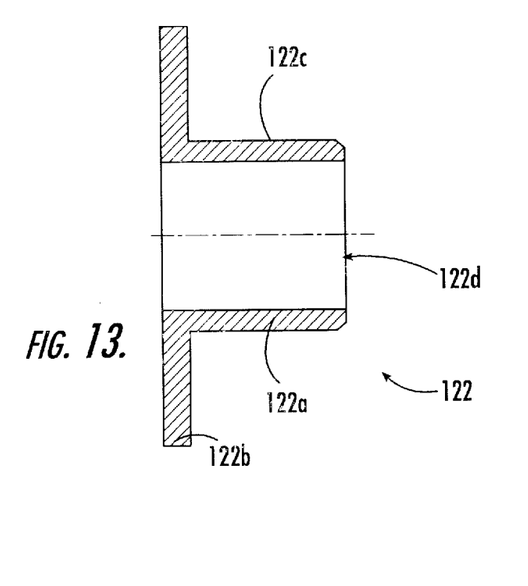
FIG. 13 is a sectional side view of a grip member according to one embodiment of the present invention.

FIG. 13 shows a detailed view of the grip member 122. The grip member 122 includes a body 122a and a flared portion 122b. In one embodiment, the body 122a includes the knurled surface 122c mentioned above. A central opening 122d is defined through the grip member 122. The grip member 122 is formed of a conductive material, such as brass.

Figure 14:
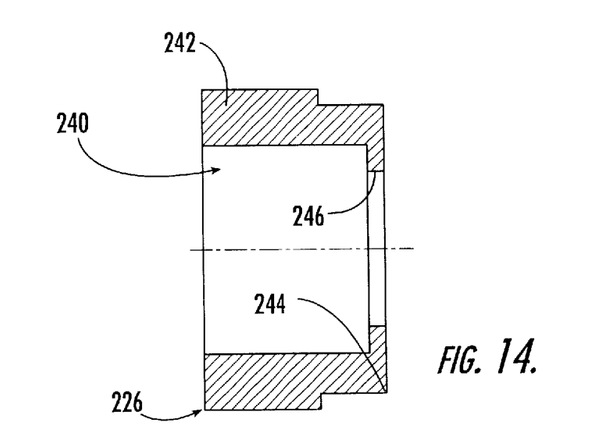
FIG. 14 is a sectional side view of a fitting member according to one embodiment of the present invention.

FIG. 14 shows a detailed view of the fitting member 226 shown in FIGS. 1 and 2. The fitting member 226 comprises a tubular body 242 that is made from a conductive material, such as brass. The body 242 defines a central opening 240. The body 242 also includes an annular shoulder 244 which defines a retaining lip 246. In this regard, the fitting member 226 helps secure the grip member 122 and grip spacer 124.

In light of the foregoing, consider the following example wherein a hybrid cable becomes damaged in the field. By way of comparison, recall that many conventional cable connectors require that the entire damaged cable be replaced with a new cable so that the damaged cable can be sent to a factory for repairs. This, of course, requires the repair operator to carry at least one replacement cable, which is cumbersome and expensive. Other conventional cable connectors that allow for repairs in the field require that potting compounds be used to secure the optical fibers and/or electrical conductors. As described above, potting compounds are disadvantageous because the optical fibers and electrical conductors are permanently secured, which prevents adjustments due to misalignment, etc. Potting compounds also increase the complexity and cost of the repair, as the potting compound must be removed (which typically destroys the surrounding components) and new potting compound must be applied. Further, potting compounds are messy and add time to the repair process.

Advantageously, the cable connector and methods of the present invention allow for field repairs without using potting compounds. In the example wherein a cable is to be repaired in the field, the repair according to one embodiment of the present invention is as follows: First, the components used to secure the cable, including the grip member, spacer, resilient washer, and insulator lock, are either slid over the cable or about the optical lines and electrical conductors. The electrical conductors or wires are then stripped to a prescribed length, and the exposed wires are secured to respective contact pins, which may be male or female depending on the splice connection. In one embodiment, the contact pins are secured to the exposed wires by crimping, although other methods of securing may also be used. Next, the optical fibers are stripped according to Alcoa Fujikura's assembly instructions for AFL Field Master™ ST connectors and inserted through the associated bias member.

The exposed optical fiber is threaded through the ferrule and secured thereto according to the recommended Alcoa instructions. The exposed end of the optical fiber is then made flush with the end of the ferrule and hand polished. All of the ferrules and contact pins are then inserted into the insulator device. The insulator lock is then slid into engagement with the insulator device such that the raised portion of the insulator lock releaseably locks with the receptacle of the insulator device. In this manner, the optical fibers and electrical conductors are secured in the insulator device of the respective male or female portion of the connector. To further secure and seal each end of the spliced hybrid cable, the tubular spacer is positioned about the cable, and the grip member, grip spacer, washer, and fitting member are positioned and tightened about the cable as shown and described above.

Thus, the hybrid cable connector 10 of the present invention provides important advancements in the state of the art.

Specifically, the connector 10 of the present invention can be adjusted in the field without wasting components as can occur when using potting compounds and/or other conventional methods.

That which is claimed:

1. A connector for securing two cables having fiber optic and electrical lines and having an outer sheath conductor, the connector comprising:

a male portion and a female portion operable to slidably engage one another, the male portion including at least one ferrule defining a central opening therethrough for receiving an optical fiber, at least one contact pin for receiving a power line, at least one contact pin for receiving an audio line, an insulator device defining a plurality of channels therethrough, the channels formed to receive the at least one ferrule, the at least one power line contact pin, and the at least one audio line contact pin, the insulator device also defining a recessed annular channel at one end, and an insulator lock defining a plurality of channels therethrough corresponding to the channels defined by the insulator device, the insulator lock formed to releaseably engage the recessed annular channel of the insulator device such that the ferrule and the contact pins are secured when the insulator lock is in the engaged position;

a grip member having a body portion defining a central opening for receiving one of the cables such that the outer sheath conductor of the cable is positioned outside of the central opening; and a crimp ring positioned about the body portion of the grip member for securing the outer sheath conductor of the cable.

2. A connector according to claim 1, further comprising a metallic spacer positioned between the body portion of the grip member and the crimp ring.

3. A connector according to claim 1, further comprising a tubular spacer positioned between the insulator device and the grip member for further securing the cable in the connector.

4. A connector according to claim 3, wherein the tubular spacer is formed of a thermoplastic material.

5. A connector according to claim 1, wherein the male portion includes two ferrules, two power line contact pins, and two audio line contact pins.

6. A connector according to claim 1, wherein the insulator device is formed from an insulative material selected from the group consisting of polycarbonate and ABS plastic.

7. A connector according to claim 1, further comprising a bias member for biasing the at least one ferrule towards the end of the insulator device opposite the end defining the annular channel.

8. A connector for securing two cables having fiber and electrical lines and having an outer sheath conductor, the connector comprising:

a male portion and a female portion operable to slidably engage one another, the female portion including a ferrule defining a central opening therethrough for receiving an optical fiber, at least one contact pin having opposing ends, defining an opening at one end for receiving a power line and a slotted opening at the other end for receiving a corresponding contact pin from the male portion, at least one contact pin having opposing ends, and defining an opening at one end for receiving an audio line and a slotted opening at the other end for receiving a corresponding contact pin from the male portion, an insulator device defining a plurality of channels therethrough, the channels formed to receive the at least one power line contact pin and the at least one audio line contact pin, the insulator device also defining a recessed annular channel at one end, and an insulator lock defining a plurality of channels therethrough corresponding to the channels defined by the insulator device, the insulator lock formed to releaseably engage the recessed annular channel of the insulator device such that the ferrule and the contact pins are secured to the insulator device when the insulator lock is engaged position;

a grip member having a body portion defining a central opening for receiving one of the cables such that the outer sheath conductor of the cable is positioned outside of the central opening; and a crimp ring positioned about the body portion of the grip member for securing the outer sheath conductor of the cable.

9. A connector according to claim 8, further comprising a metallic spacer positioned between the body portion of the grip member and the crimp ring.

10. A connector according to claim 8, further comprising a tubular spacer positioned between the insulator device and the grip member for further securing the cable in the connector.

11. A connector according to claim 8, wherein the female portion includes two ferrules, two power line contact pins, and two audio line contact pins.

12. A connector according to claim 8, further comprising a bias member for biasing the at least one ferrule towards the end of the insulator device opposite the end defining the annular channel.

13. A connector for securing two cables having fiber optic and electrical lines, the connector comprising:

a male portion and a female portion operable to slidably engage one another, each of the male and female portions comprising:

at least one ferrule defining a central opening therethrough for receiving an optical fiber, the ferrule of the male portion and the ferrule of the female portion being biased forwardly into an abutting relationship so that light can travel between the ferrules, at least one contact pin for receiving associated power lines, the power line contact pin of the male portion defining an opening at one end for receiving a power line and having a tip at the other end operable to engage a slotted opening defined in the power line contact pin of the female portion, and an insulator device defining a plurality of channels therethrough, the channels formed to receive the at least one ferrule and the at least one contact pin, each of the insulator devices also defining a receptacle at one end; and an insulator lock defining a plurality of channels therethrough corresponding to the channels defined by the insulator device, the insulator lock being formed to releaseably engage the receptacle of the insulator device such that the ferrule and contacts pins extending therethrough are secured in the insulator device when the insulator lock is in the engaged position.

14. A connector according to claim 13, wherein the male portion and the female portion each include two ferrules, two power line contact pins, and two audio line contact pins.

15. A connector according to claim 13, further comprising a bias member positioned adjacent the at least one ferrule for biasing the least one ferrule towards the end of the insulator device opposite the end defining the receptacle thereof.

16. A connector according to claim 13, wherein the receptacle is in the form of a recessed annular channel.

17. A method of terminating a pair of hybrid cables each having at least one optical fiber, at least one power line, and at least one audio line, the method comprising:

securing the at least one power line and the at least one audio line of each hybrid cable in corresponding contact pins;

securing the least one optical fiber of each hybrid cable in an opening formed through a ferrule;

positioning the at least one contact pin and the at least one ferrule of each hybrid cable in channels formed through an insulator device defining a receptacle at one end; and securing the at least one contact pin and the at least one ferrule in the insulator device by inserting an insulator lock formed to engage the receptacle of the insulator device.

18. A method according to claim 17, further comprising sealing the hybrid cable by positioning a grip member about the at least one optical fiber, at least one power line, and at least one audio line of each hybrid cable so that an outer sheath conductor of each hybrid cable is exposed, and mechanically pressing a crimp ring about the exposed outer sheath conductor so that the outer sheath conductor is interposed between the grip member and the crimp ring.

19. A method according to claim 18, wherein the sealing step includes positioning a resilient washer and an end cap about the hybrid cable.

20. A method according to claim 17, further comprising positioning the insulator devices of the hybrid cables in an abutting relationship so that the respective audio line contact pins and power line contact pins of each hybrid cable engage one another, and so that the respective ferrules of each hybrid cable abut one another so that the optical fibers secured within ferrules form a continuous path for light to pass.

21. A method according to claim 17, further comprising positioning a tubular spacer between the insulator device and the grip member on each hybrid cable for further securing the hybrid cable.

22. A method according to claim 17, further comprising biasing the at least one ferrule of each optical fiber towards the end of the respective insulator device opposite the end defining the receptacle.

23. A connector for terminating a hybrid cable containing at least one electrical conductor and at least one optical fiber arranged side-by-side within the cable, comprising:

an outer housing defining a passage extending axially therethrough for receiving an end of the cable;

an insulator device secured within the passage of the outer housing, the insulator device defining at least first and second side-by-side apertures formed axially therethrough;

a contact member configured to be attached to an end of the at least one electrical conductor of the cable and to be inserted axially into the first aperture of the insulator device from one end thereof and to be slid axially up against a stop defined by the insulator device, and a ferrule configured to be attached to an end of the at least one optical fiber with the fiber extending through a bore formed through the ferrule, the ferrule being configured to be inserted axially into the second aperture of the insulator device from said one end thereof and to be slid axially up against another stop defined by the insulator device; and an insulator lock received axially into said one end of the insulator device and defining at least a pair of passages for passage of the at least one electrical conductor and optical fiber therethrough, the insulator device and insulator lock being configured such that the insulator lock removably snaps into said one end of the insulator device behind the at least one contact member and ferrule to prevent the contact member and ferrule from being withdrawn out said one end of the insulator device.

24. A connector according to claim 23, wherein the insulator device defines six apertures formed axially therethrough.

25. A connector according to claim 23, further comprising a grip member for securing an outer conductive braid of the hybrid cable that is positioned about the at least one electrical conductor and the at least one optical fiber.

* * * * *

UNITED STATES PATENT AND TRADEMARK OFFICE
CERTIFICATE OF CORRECTION

PATENT NO.    : 6,454,462 B2
DATED         : September 24, 2002
INVENTOR(S)   : Nguyen et al.

It is certified that error appears in the above-identified patent and that said Letters Patent is hereby corrected as shown below:

Column 5,
Line 25, "pain" should read -- pin --;
Line 25, after "power" insert -- lives --.

Column 7,
Line 3, "defines" should read -- defined --;
Line 9, after "fibers 36" insert -- via --.

Column 9,
Line 54, after "fiber" insert -- optic --.

Column 10,
Line 15, after "is" insert -- in the --.

Signed and Sealed this

Thirty-first Day of December, 2002

JAMES E. ROGAN
*Director of the United States Patent and Trademark Office*